United States Patent
Maric et al.

(10) Patent No.: US 12,222,514 B1
(45) Date of Patent: Feb. 11, 2025

(54) NOTIFICATIONS IN HEADBANDS

(71) Applicant: Apple Inc., Cupertino, CA (US)

(72) Inventors: Ivan S. Maric, San Francisco, CA (US); Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/655,725

(22) Filed: Mar. 21, 2022

Related U.S. Application Data

(60) Provisional application No. 63/223,876, filed on Jul. 20, 2021.

(51) Int. Cl.
*G02B 27/01* (2006.01)
*G06F 1/16* (2006.01)

(52) U.S. Cl.
CPC ..... *G02B 27/0176* (2013.01); *G02B 27/0172* (2013.01); *G06F 1/165* (2013.01); *G02B 2027/0178* (2013.01)

(58) Field of Classification Search
CPC ............ G06F 1/165; G02B 2027/0178; G02B 27/0176; G02B 27/0172
See application file for complete search history.

(56) References Cited

U.S. PATENT DOCUMENTS

| | | | | |
|---|---|---|---|---|
| 9,733,482 | B2* | 8/2017 | West | G02B 27/0179 |
| 10,201,089 | B2* | 2/2019 | Huitema | H05K 1/0281 |
| 10,289,163 | B2* | 5/2019 | Huitema | G06F 1/163 |
| 10,318,129 | B2* | 6/2019 | Inagaki | G04G 9/0064 |
| 10,732,743 | B2* | 8/2020 | Wang | G06F 3/016 |
| 11,044,544 | B2* | 6/2021 | Pong | H04N 23/66 |
| 2011/0107958 | A1 | 5/2011 | Pance et al. | |
| 2014/0009606 | A1* | 1/2014 | Puccio | H04N 7/183 |
| | | | | 348/143 |
| 2015/0261291 | A1* | 9/2015 | Mikhailov | G02B 27/0093 |
| | | | | 345/156 |
| 2016/0041581 | A1* | 2/2016 | Piccionelli | G02F 1/133305 |
| | | | | 345/156 |
| 2019/0138049 | A1* | 5/2019 | Serota | H04R 1/1066 |
| 2019/0313172 | A1* | 10/2019 | Sunshine | H05K 1/189 |

FOREIGN PATENT DOCUMENTS

| | | | | |
|---|---|---|---|---|
| CN | 209294733 U | * | 8/2019 | |
| WO | WO-2006092598 A2 | * | 9/2006 | A41D 27/085 |

* cited by examiner

*Primary Examiner* — Ricardo Osorio
(74) *Attorney, Agent, or Firm* — Dorsey & Whitney LLP

(57) ABSTRACT

A wearable electronic device includes a head-mounted display (HMD) and a retention band connected to the HMD. The retention band can include a display assembly positioned within the retention band for displaying visual information on an exterior of the retention band.

16 Claims, 13 Drawing Sheets

NOTIFICATIONS IN HEADBANDS

CROSS-REFERENCE TO RELATED APPLICATIONS

This application claims priority to U.S. Provisional Patent Application No. 63/223,876, filed 20-7-2021, and entitled "NOTIFICATIONS IN HMD HEADBANDS," the entire disclosure of which is hereby incorporated by reference.

FIELD

The described embodiments relate generally to a display on a wearable electronic device. More particularly, the present embodiments relate to an external display positioned on a retention band of a head-mounted device.

BACKGROUND

Wearable electronic devices, including head-mounted displays (HMDs) are increasingly used in a wide variety of applications and settings, including aviation, engineering, medicine, military applications, and video gaming. HMDs are intended to provide the user with an interactive and immersive experience, for example, through visual and audio stimulation.

However, obtaining status information about the HMD can be burdensome when not wearing the HMD, as it often requires a user to put on or don the HMD to view status information via the primary display. Additionally, it can be difficult for an outside observer to obtain information regarding the HMD or the user without disturbing the user to inquire of the status. Moreover, as HMDs become more common, it can be desirable to distinguish or personalize the HMD to the user's preference.

SUMMARY

According to an aspect of the present disclosure, a wearable electronic device includes a head-mounted display (HMD) and a retention band connected to the HMD, the retention band including a display assembly positioned within the retention band.

In some examples, the HMD includes a housing and a primary display connected to the housing. The display assembly can displays visual information about a status of the HMD, and the retention band can include a flexible fabric, the flexible fabric having perforations. The retention band can include micro-perforations. A transparent cover can be coupled to the retention band and be positioned over the display assembly.

In some examples, the display assembly displays visual information that changes based on a mode of the HMD. The visual information can be dynamic. The display assembly can display visual information when the wearable electronic device is in an inactive mode. The retention band can include fabric. The HMD can include a battery secured to the retention band. In some examples, the HMD includes a flexible printed circuit positioned in the retention band. The display assembly can include micro-light-emitting diodes. The display assembly can include an optical fiber.

According to some aspects, a headband includes a fabric defining perforations and an internal volume, and a display unit disposed within the internal volume and behind the perforations.

In some examples, the perforations have a density of about 2,500 to about 102,400 perforations per square inch.

The perforations can have an average diameter of less than a millimeter. The fabric can include a weaved fabric, and the display unit can include a fiber optic cable weaved into the fabric.

According to some aspects, a head-mounted display (HMD) includes a housing, a primary display unit disposed in the housing, a retention member coupled to the housing, and a secondary display unit integrated with the retention member.

In some examples, the HMD includes smart glasses and the retention member includes a support arm that extends along a side of a user's head. The retention member can include a head strap that secures to a user's head. The secondary display unit can be positioned within a thickness of the retention member. The secondary display unit can at least partially define an exterior of the retention member. The visual information displayed by the secondary display unit can change based on a detected presence of a user.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As virtual reality (VR) and mixed reality (MR) become more ubiquitous, the need for user friendly head-mounted displays with quality components increases. Traditionally, the focus of VR/MR display systems has been on the visual field of the user while wearing the device. However, it can be advantageous to equip the HMD with an external facing display. Moreover, with limited real estate on HMD, the location of the external facing display can require novel solutions as describe herein.

Traditionally, in order for a user to obtain status information of the HMD, it would be necessary for the user to don the HMD and view the primary display. Likewise, in traditional HMDs, in order for an outside observer to obtain information about the status of the user or the HMD while the user was wearing the HMD, it would be necessary to interrupt the user to learn their status or the status of the HMD. Thus, an external facing display positioned on the retention band advantageously allows for a more convenient way for a user or an outside observer to learn of a status of the HMD.

According to some examples, the retention band securing the HMD to the user's head can be light transmissive (e.g., translucent materials or micro-perforations). A display, such as an array of micro-LEDs can be positioned adjacent or within the retention band. A wide variety of visual information can be presented to an outside observer (i.e., an individual not wearing the HMD) using the display on the retention band.

These and other embodiments are discussed below with reference to FIGS. 1-7. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
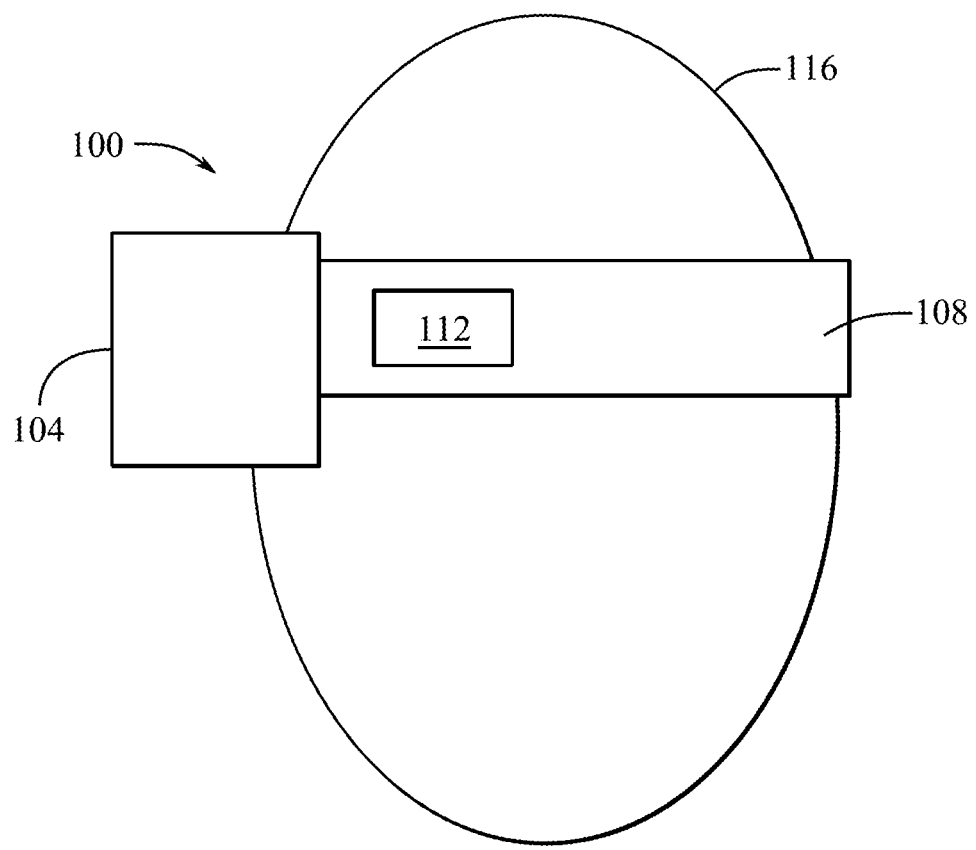
FIG. 1 shows a side view of a wearable electronic device being worn by a user.

FIG. 1 illustrates a side view of a wearable electronic device 100 positioned on a user's head 116. The wearable electronic device 100 can include a head-mounted display (HMD) 104 and a retention band 108. The HMD 104 can include a primary display (not shown) and a frame attached to a primary display. In some examples, the primary display includes an opaque, translucent, transparent, or semi-transparent screen, including any number lenses, for presenting visual data. The frame can at least partially border one or more edges of the display. In some examples, the frame can be configured to contact a user's head or face 116. In some examples, the frame blocks outside light and limits the peripheral view of the user. Various components of the HMD 104 can be housed within the frame. For example, the hardware and electronics which allow functionality of the HMD can be housed within the frame.

The wearable device 100 can be worn on the user's head 116 such that the HMD 104 is positioned over the user's face and disposed over one or both of the user's eyes. The HMD 104 can be connected to the retention band 108. In some examples, the retention band 108 can be positioned against the side of a user's head 116 and in contact therewith. In some examples, the retention band 108 can be at least partially positioned above the user's ear or ears. In some examples, the retention band 108 can be positioned adjacent to the user's ear or ears. The retention band 108 can extend around the user's head 116. In this way, the HMD 104 and the retention band 108 can form a loop that can retain the wearable electronic device 100 on the user's head 116. It should be understood, however, that this configuration is just one example of how the components of a modular wearable electronic device 100 can be arranged, and that in some examples, a different number of connector straps and/or retention bands can be included. Although the particular component 110 can be referred to as an HMD, it should be understood that the terms HMD, HMD device, and/or HMD system can be used to refer to the wearable device 100 as a whole.

The display 112 can be positioned on, adjacent to, or within, the retention band 108, such that the retention band 108 and the display 112 overlap one another. The retention band 108 can include multiple displays 112. In some examples, one or more displays 112 can span substantially across an entirety of an exterior length of the retention band 108. Additionally, while the display 112 is illustrated on a side of the retention band 108 (i.e., above a user's ear), the display 112 can be positioned on any visible portion of the retention band 108, such as on a back of the retention band 108, opposite the HMD 104. As will be discussed in greater detail herein, the display 112 can be integrated with the retention band 108 in a variety of way. For example, the display 112 integrated with the retention band can include be positioned within, underneath, or external to the retention band 108. The display 112 can include LEDs, micro-LED, a light guide, an LCD screen, or any other suitable light source.

In some examples, the display 112 can illustrate custom images selected or created by the user. In some example, the display 112 can display visual information not directly relevant to the status of the HMD. For example, the display 112 can illustrate a logo, such as a company's brand or a logo of a sponsor. Further details regarding communications between the wearable device 100 and companion devices is described below with reference to FIG. 2.

Figure 2:
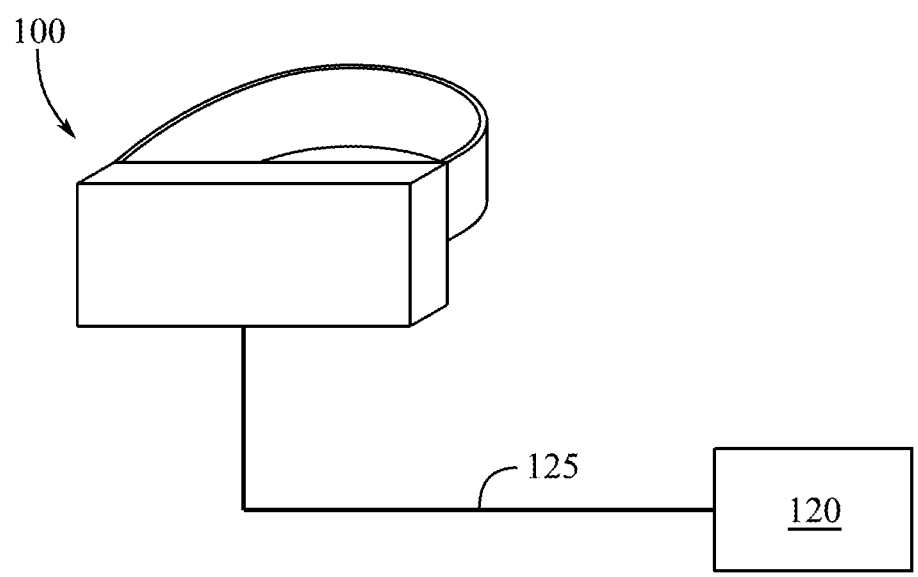
FIG. 2 shows a network of electronic devices.

FIG. 2 illustrates an example communication network that includes the wearable electronic device 100 and a companion electronic device 120. The wearable device 100 can be in communication with the companion device 120 via a communications link 125. The communications link 125 can be a physical connection, such as an electrical wire, or can be a wireless connection, such as Bluetooth, Wi-Fi, proximity sensors, etc. The companion electronic device 120 can be a remote, or a personal computing device such as a smart phone, a smart watch, a laptop, a tablet, an HMD, or any other form of electronic device. As described in further detail below, the companion device 120 can influence the wearable device 100 via communications link 125. For example, the companion device 120 can influence the visual information, content, style, frequency, and operation of the content provided by the display 112. Further details regarding the construction and components of the wearable device 100 are described below with reference to FIGS. 3A-5.

Figure 3A:
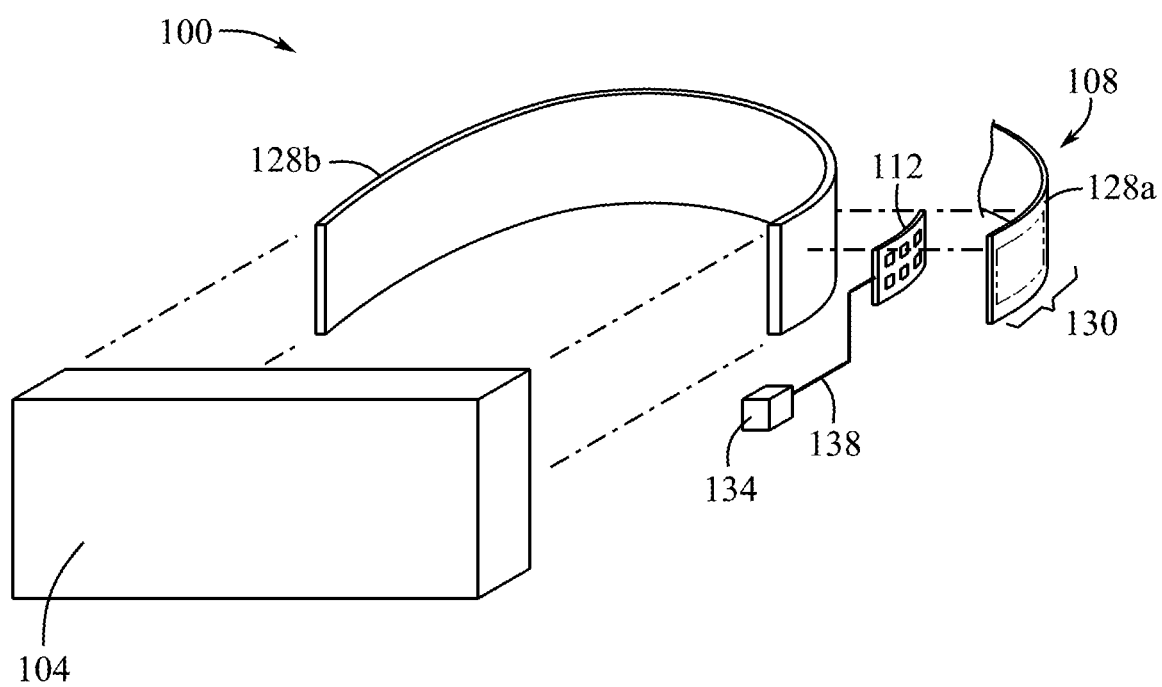
FIG. 3A shows a perspective exploded view of a wearable electronic device.

FIG. 3A illustrates a perspective exploded view of the wearable electronic device 100, according to one example. The retention band 108 can include an inner portion 128b that contacts a user's head when worn, and an outer portion 128a at least partially defining an exterior surface of the wearable device 100. The outer portion 128a can be integrally formed with the inner portion 128b. In other words, the inner portion 128b and the outer portion 128a can be made from a single piece of material (shown separated here for simplicity). In some examples, the outer portion 128a and the inner portion 128b can be coupled together, for example using adhesive, thread, or other coupling techniques. In some examples where the outer portion 128a is different than the inner portion 128b, the outer portion 128a can include a material that is light transmissive. The display 112 can be positioned between the inner portion 128b and the outer portion 128a, such that the display 112 is positioned within the retention band 108. In some examples, the outer portion 128A of the retention band 108 can include a perforated section 130. The perforated section 130 can include micro-perforations formed in the material of the outer portion 128a. The perforated section 130 can allow light from the display 112 to pass through the outer portion 128a to be visible to an outside observer. As discussed in greater detail with regard to FIGS. 3B and 3C, the display 112 can be electrically coupled to a battery 134 and/or electronic processors or controllers via one or more electrical connections 138.

In some examples, the perforated section 130 can include a grid of generally uniform apertures, with the image being a result of the display 112 and not due to any particular pattern of the apertures. As an alternative to a generally uniform grid of micro-perforations, the micro-perforations might be provided in one or more patterns or symbols, such that the image is a result of the pattern and not of the display 112 itself. In some examples, the natural weave of the fabric allows for light to pass through without the need for any additional modification.

Each micro-perforation can be sized a sufficient amount to allow light to pass through the retention band 108 while remaining relatively invisible to the naked eye. For example, each opening of the micro-perforated section 130 can define a diameter that is less than a millimeter, and in some examples, each opening can define a diameter of approximately 20-80 microns. A separation between each of the micro-perforations can be approximately 80-500 microns, and the perforated section 130 can have about 50 to about 320 dots or perforations per inch (DPI), or between about 2,500 to about 102,400 perforations per square inch.

In some examples, the display 112 is not visible when not illuminated. For example, the display 112 can be hidden beneath the micro-perforated section 130, such that the retention band 108 maintains a uniform appearance.

In some examples, the display 112 is flexible and capable of bending or curving to according to a shape of the retention band 108 on the user's head. In some examples, the display 112 includes micro-LEDs on flex cables and/or optical fibers or fiber optic cables that are woven into the fabric of the retention band 108. In some examples, the retention band 108 can include conductive fibers woven into the fabric and connected to the micro-LEDs.

The retention band 108 can be made from a flexible material and can securely and snuggly fit around a head of the user 116. The retention band 108 can be made from a woven fabric, leather, polymer, or any other material compatible with micro-perforations or having light transmissive properties. In some examples, the retention band 108 can be made from silicone or thermoplastic polyurethane (TPU). In some examples, the retention band 108 can be made from compression molded materials, such as rubber. The display 112 can be integrated into the compression molded materials. In some example, the retention band 108 is semi-rigid. For example, the retention band 108 can be rigid where the display 112 is located.

Figure 3B:
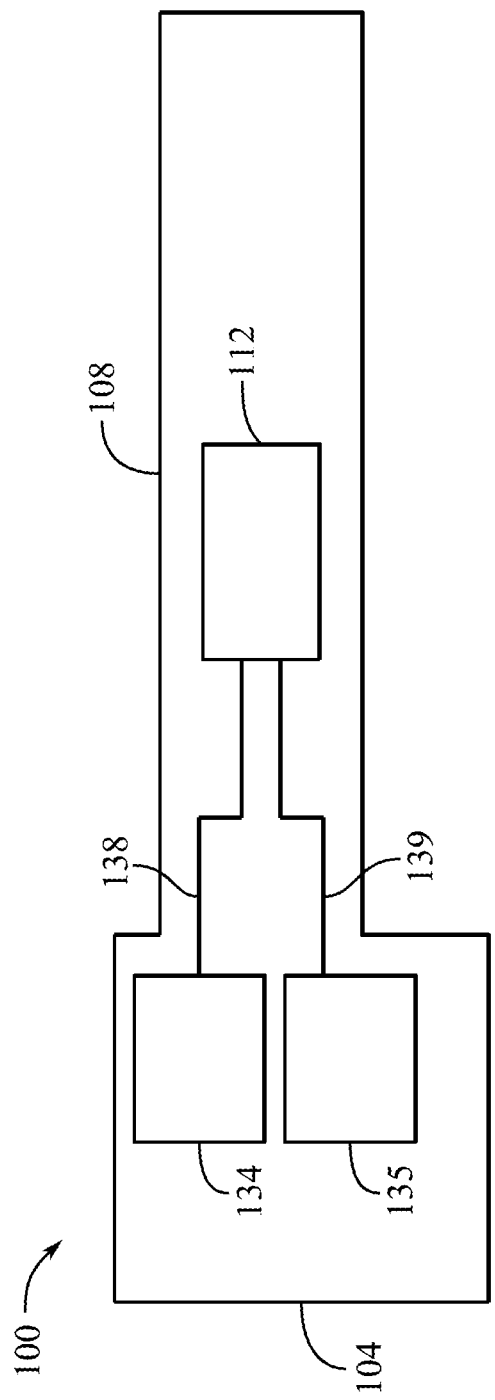
FIG. 3B shows a cross-sectional side view of a wearable electronic device.

FIG. 3B illustrates a cross-sectional side view of a wearable device 100. In some examples, the display 112 can be operatively coupled to a power source, such as a battery 134 that is disposed within or on the housing of the HMD 104 via electrical connection 138. The display 112 can also be communicatively coupled with a processor 135 or other controller that is housed within the wearable device 100. The battery 134 and/or the processor 135 can be located with the housing of the HMD 104, located within the retention band 108, disposed exterior to the housing of the HMD 104 and the retention band 108, or combinations thereof. The display 112 can receive commands or instruction from the processor via an electrical connection 139.

Although the display 112 is shown as being connected to the battery 134 and the processor 135 through a wired connection 138 and 139 respectively, it should be understood that in some examples, the display 112 can wirelessly receive data and/or power from the battery 134 and/or processor 135 by any desired method or technology. The battery 134 can be incorporated into, or can be an integral part of, one or more of the other components of the device 100, including the retention band 108 and/or the HMD 104. Further, although the components of the wearable electronic device 100 are shown as being connected to one another at certain locations, it should be understood that any of the components of the device 100 can be electrically and/or mechanically connected to one or more of any of the other components of the device 100, in any manner and location, as desired.

In some examples, the retention band 108 can include a flexible printed circuit board. The flexible printed circuit board can bend or flex with the retention band 108. Accordingly, the shape or comfort of the retention band 108 is not impacted by the flexible printed circuit disposed therein. In other examples, the wearable device 100 can include one or more rigid circuit boards that are interconnected via cables or flexible printed circuits. For example, a rigid circuit board can be housed in a rigid portion of the HMD 104 and/or the retention band 108. The rigid circuit board can be electrically connected to the display 112 or other components through flexible cables, wires, or flexibles printed circuits.

Figure 3C:
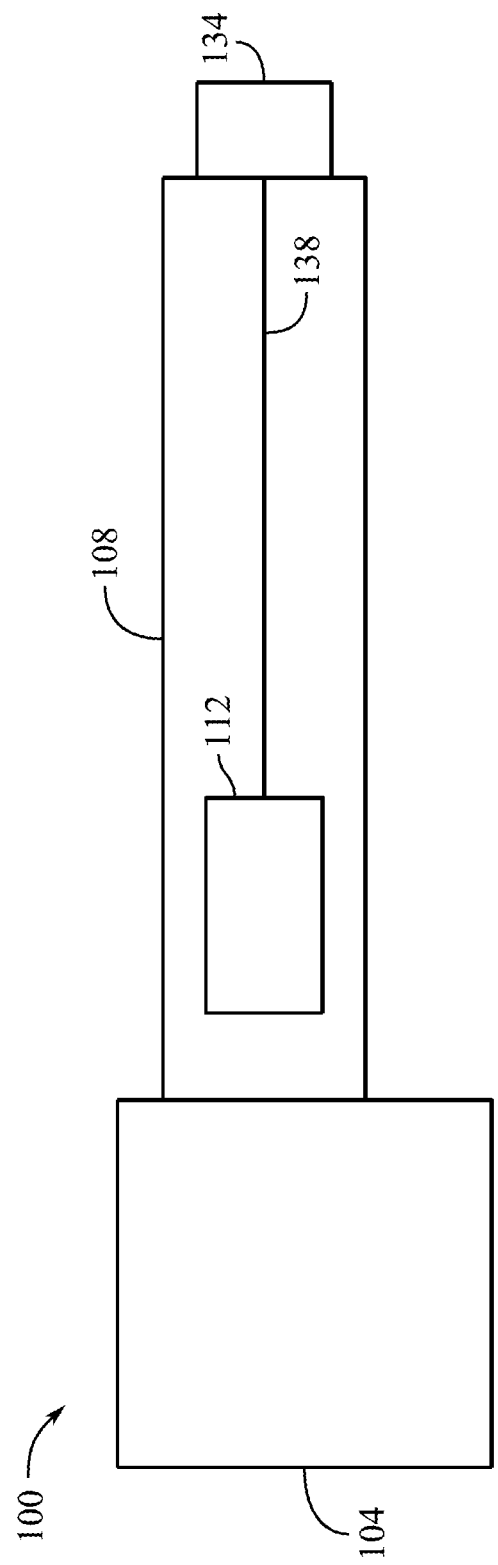
FIG. 3C shows a cross-sectional side view of a wearable electronic device with a power source position on a retention band.

FIG. 3C illustrates a cross-sectional side view of an electronic device 100. In some examples, the retention band 108 can include other operational or functional components in addition to the display 112. For example, the retention band 108 can include a battery 134 that can be in electrical communication with the HMD 104 and/or the display 112. Additionally, the device 100 can include a separate processing unit (not shown), such as the processor 135 shown in FIG. 3B, that can be connected to the retention band 108.

Figure 4:
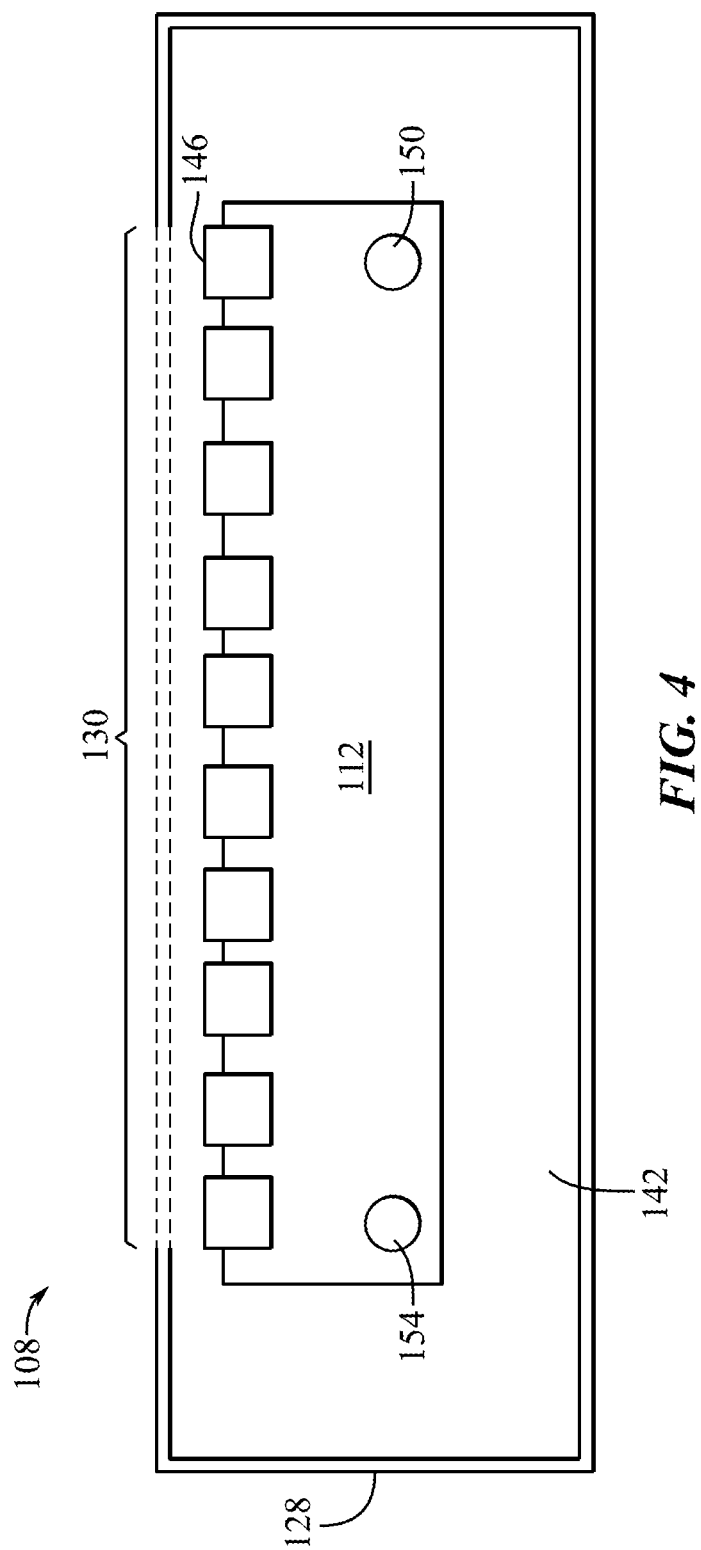
FIG. 4 shows a cross-section of a retention band of a wearable device.

FIG. 4 illustrates a cross-section of the retention band 108, according to one example. The retention band 108 can include external material 128 that at least partially surrounds the display 112. The retention band 108 can include filler material or cushioning 142 that can be positioned between the external material 128 and the display 112 in order to assist in securing the display 112 within the retention band 108, and also to improve comfort for the user. The display 112 can include an array of micro-light emitting diodes (LEDs) 146. The micro-LEDs 146 can be aligned with the perforated section 130 in the retention band 108. Light emitted by the micro-LEDs 146 can pass through the perforated section 130 where it is visible to an outside observer. In some examples, the display 112 can include electrical connections or ports 150 and 154 configured to transmit data and/or power. For example, a battery connection 150 can be an electrical connection to receive power from battery 134, and a data connection 154 can be an electrical port integrated into the display 112 to establish a data communication channel with the processor 135. Additionally, the display 112 can include a processor (not shown) disposed directly on the display and in electrical communication with the micro LEDs 146.

As illustrated in FIG. 4, the display 112 can be partially or fully surrounded by the retention band 108. In some examples the external material 128 in combination with the perforated section fully encompass the display 112. In some examples, the thickness of the retention band 108 is substantially uniform. For example, the display 112 can be substantially thin so as to not significantly increase a thickness of the retention band 108 at the location of the display 112. In some examples, the retention band 108 includes less cushioning 142 or fabric between the display 112 and the user's head so as to not cause an increase in the thickness of the retention band 108 at the perforated section 130.

Figure 5:
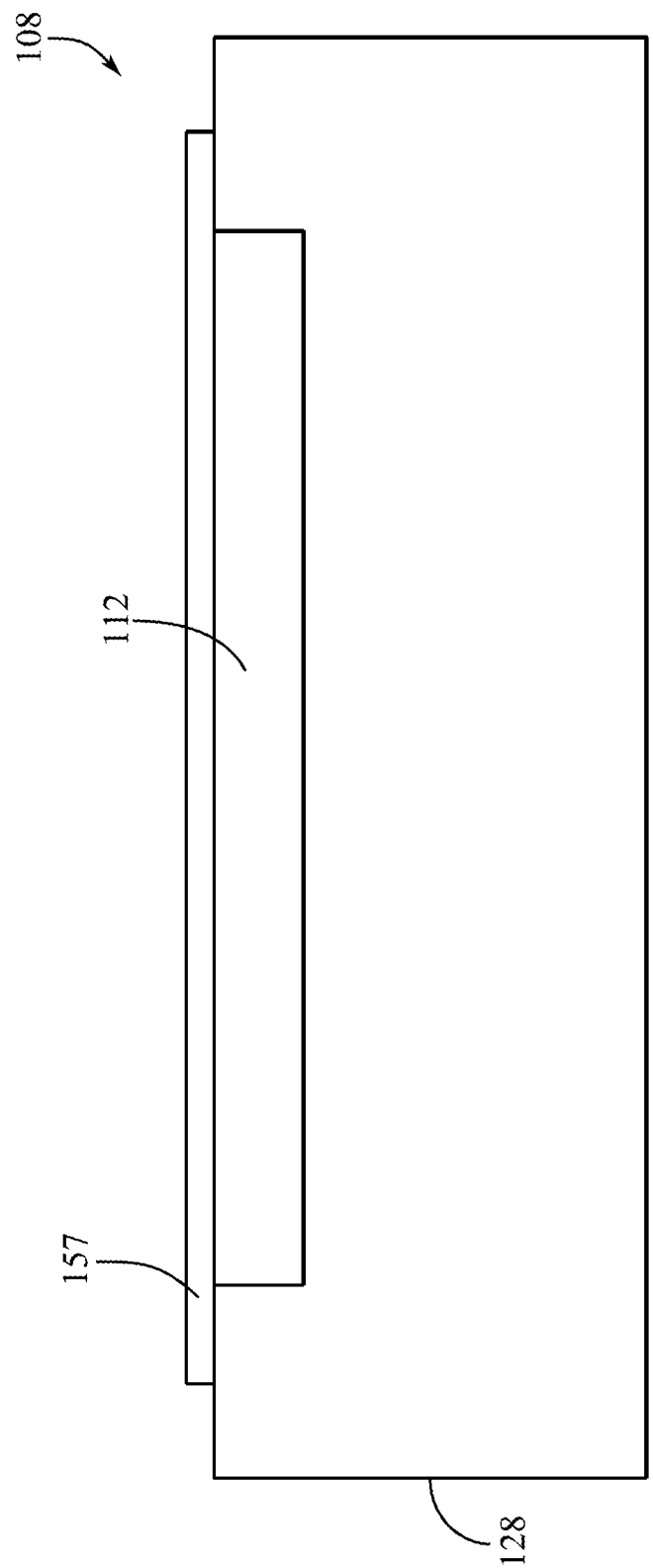
FIG. 5 shows a cross-section of a retention band of a wearable device.

FIG. 5 illustrates a cross-section of retention band 108 according to one example. The display 112 can be not fully surrounded by the retention band 108. As illustrated in FIG. 5, the display 112 can define an exterior surface of the retention band 108. Further, in some examples, a transparent cover 157 can overlay the display 112 in order to secure and protect the display 112. The cover 157 can be secured to the material 128 of the retention band 108. In some examples, the cover 157 is secured to the display 112, which is secured to the retention band 108. In some examples, the display 112 and/or the cover 157 can be secured to the retention band 108 using an adhesive. In some examples the cover 157 includes optical properties, such as diffusive properties.

As described herein, the cover 157 can be translucent or transparent (e.g., light transmissible). The cover 157 can be formed from one or more translucent materials including, for example, glass, ceramic, plastic, or a combination thereof. As used herein, the term translucent refers to a material or layer that allows the passage of light and does not require that the material or layer be transparent, clear, or otherwise free from features that scatter or absorb some amount of light. In some examples, the cover 157 is optically transparent, partially, transparent, or otherwise able to transmit light. The cover 157 can be configured to deform in response to an input (e.g., a localized section may translate inward in response to a force; this may be tactilely imperceptible). This can allow the input assembly or other component to detect a force input received at the input region by measuring the bending or deflection of the translucent layer.

In some examples, the retention band 108 can include a touch sensitive layer, such as a capacitive touch pad. The touch sensitive layer can be adjacent to or overlapping the display 112 on the retention band. For example, the cover 157 can represent the touch sensitive layer. In some examples, the touch sensitive layer is transparent to allow light from the display 112 to pass there through. In some examples, a user can create a customized image to be displayed on the display 112 by drawing on the touch sensitive layer with their finger or a stylus. Further details regarding the visual information depicted by the display 112 are provided below with respect to FIG. 6A-7.

Figure 6A:
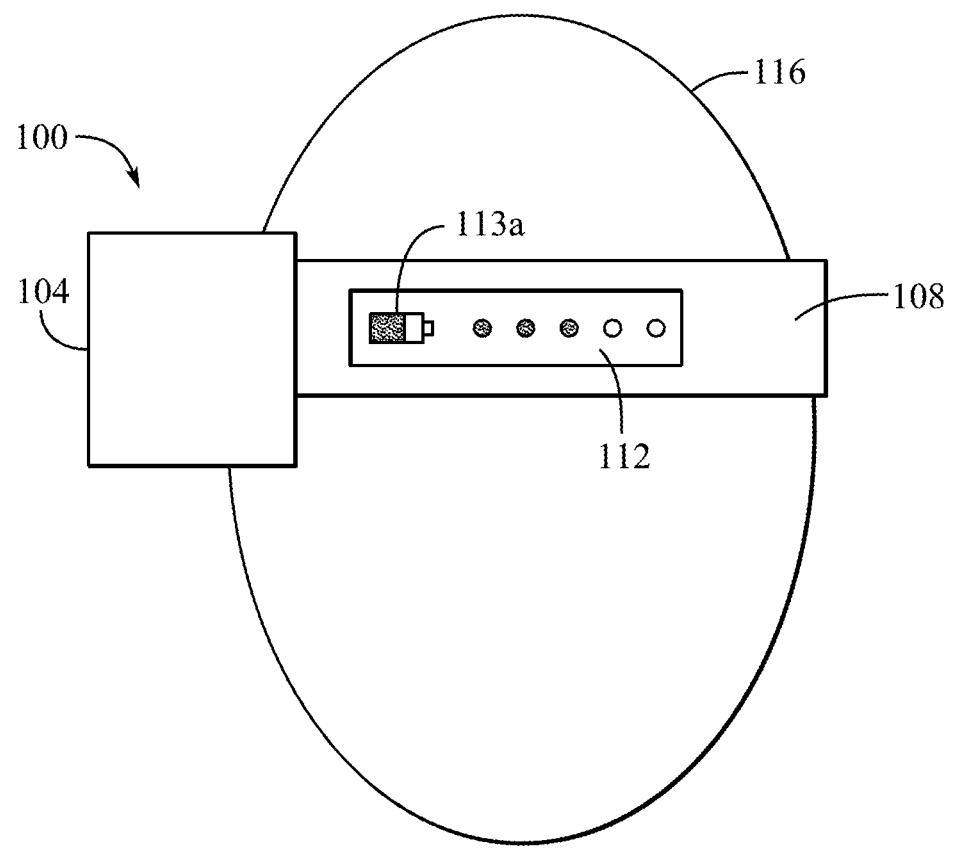
FIG. 6A shows a side view of an example icon displayed on the retention band.
Figure 6B:
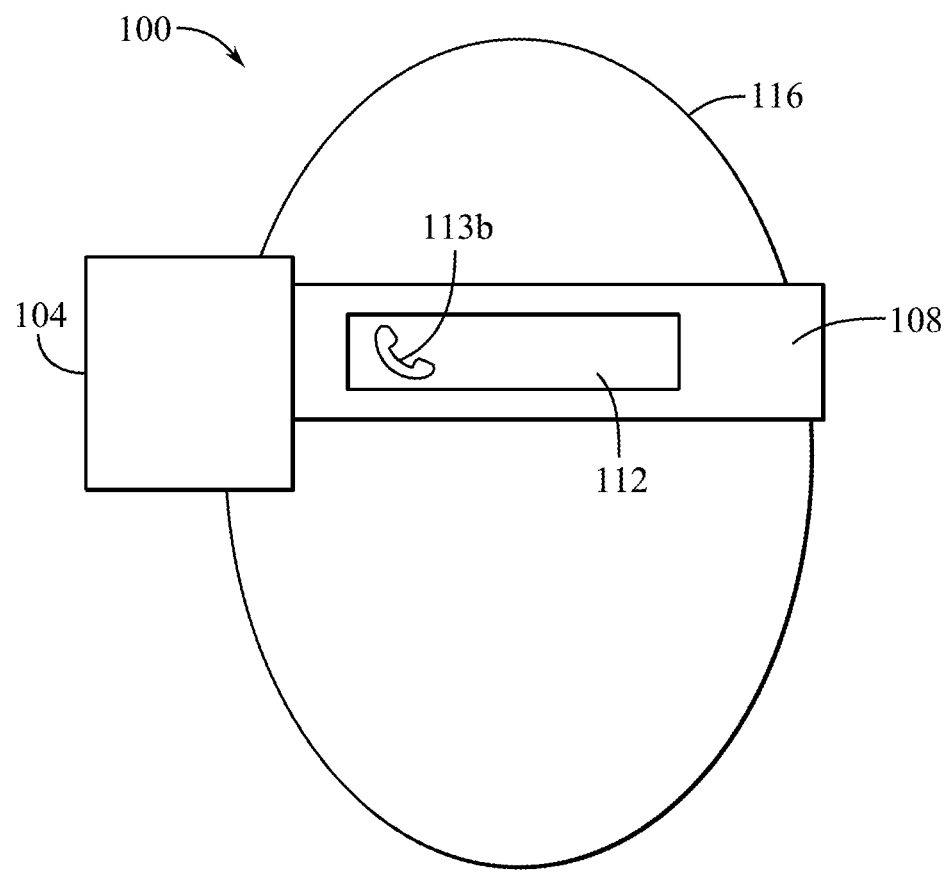
FIG. 6B shows a side view of an example icon displayed on the retention band.

FIG. 6A illustrates the wearable electronic device 100 having a battery icon 113a graphically shown on the display 112. The battery icon 113a can represent a battery status, such as remaining battery power. This can be illustrated in a number of ways. For example, the battery icon 113a can illustrate a battery charged to a level corresponding to the remaining charge. The battery icon 113a can additionally or alternatively represent the battery charge by displaying the numerical percentage of remaining battery life. Additionally or alternatively, the battery icon 113a can illustrate multiple dots, with the ratio of dots filled corresponding to the battery life. FIG. 8A also illustrates the fact that the display 112 can display multiple independent images (e.g., the battery icon and the charging dots). In some examples, the display 112 continuously displays the battery icon 113a. In some examples, the display 112 displays the battery icon 113a in response to the remaining battery life falling below a predetermined threshold to notify a user that battery life is low. In some examples, the display 112 displays the battery icon 113a in response to a request from the user, such as an audio inquiry by the user regarding the battery life. In some examples, the display 112 displays the battery icon 113a in response to a touch input from the user. The wearable device 100 can include external cameras capable of tracking a user and detecting gesture motions. The display 112 can be activated in response to a verbal input and/or a gesture from the user, regardless of whether the wearable electronic device is being worn by the user at the time.

In some examples, the wearable electronic device 100 includes one or more motion sensors (e.g., an accelerometer) and the battery icon 113a is displayed in response to sensed motion of the wearable electronic device 100, which could be indicative of the user handling the wearable electronic device 100. In some examples, a proximity of the user triggers the battery icon 113a to be displayed. It will be understood that the triggers or causes for displaying an icon are not necessarily unique to that icon. For example, the above discussed triggers for displaying the battery icon 113a can also apply to the icon discussed below with reference to FIGS. 6B-6E FIG. 6B illustrates the wearable electronic device 100 displaying a phone icon 113b on the display 112. In some examples, the wearable electronic device 100 can be capable of making and receiving calls, for instance, through a cellular network. The phone icon 113b can represent an incoming call, an outgoing call, an in-progress call, and/or a missed call. The phone icon 113b can illustrate a telephone or can simply display text (e.g., "incoming call from John"). In some examples, the display 112 continuously displays the phone icon 113b while the user is on a call, notifying those around the user that a call is in progress. In some examples, the presence of the phone icon 113b depends on whether the user is wearing the wearable electronic device. For example, if the user is wearing the device 100, the phone icon 113b indicating an incoming call may not be displayed on the external display 112, because the display 112 is not visible to the user while wearing the device 100. Instead, while wearing the device 100, the user can be notified of the incoming call via the primary display of the HMD 104.

Figure 6C:
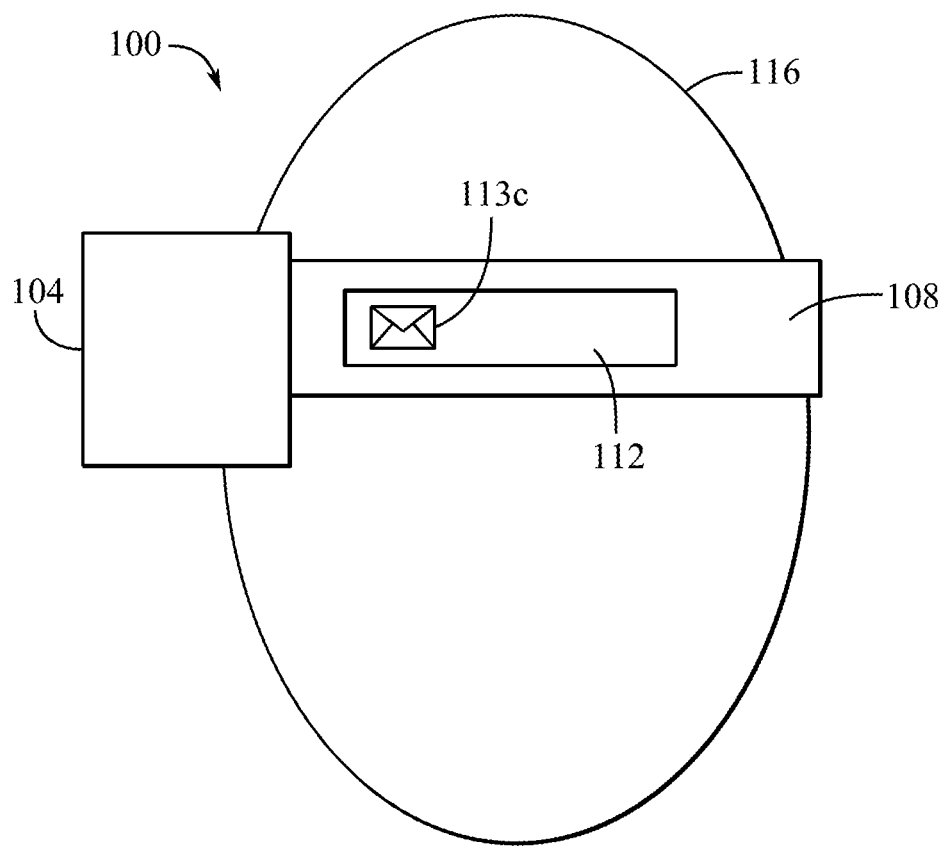
FIG. 6C shows a side view of an example icon displayed on the retention band.

FIG. 6C illustrates the wearable electronic device 100 displaying a mail icon 113c on the display 112. In some examples, the wearable electronic device 100 can be capable of sending and receiving messages, such as, text messages, e-mails, social media messages, etc. The mail icon 113c can represent a received, unread message. The mail icon 113c can be depicted as an envelope. In some examples, the name of the sender of the message is also displayed. In some examples, the display 112 continuously displays the mail icon 113c until the user opens or dismisses the message. The presence of the mail icon 113c can depend on whether the user is wearing the wearable electronic device 100. For example, if the user is wearing the device 100 when the message is received, the mail icon 113c may not be displayed because the user can be notified of the message via the primary display of the HMD 104. This provides additional privacy, ensuring that an outside observer will not be privy to private messages. Certain messages can only be displayed when the device 100 detects that the user is near (e.g., using facial recognition, proximity sensors, Bluetooth, etc.). In other words, the mail icon 113c with information of the sender and/or contents of the message can be displayed when the user is not wearing the device 100, but is determined to be nearby.

Figure 6D:
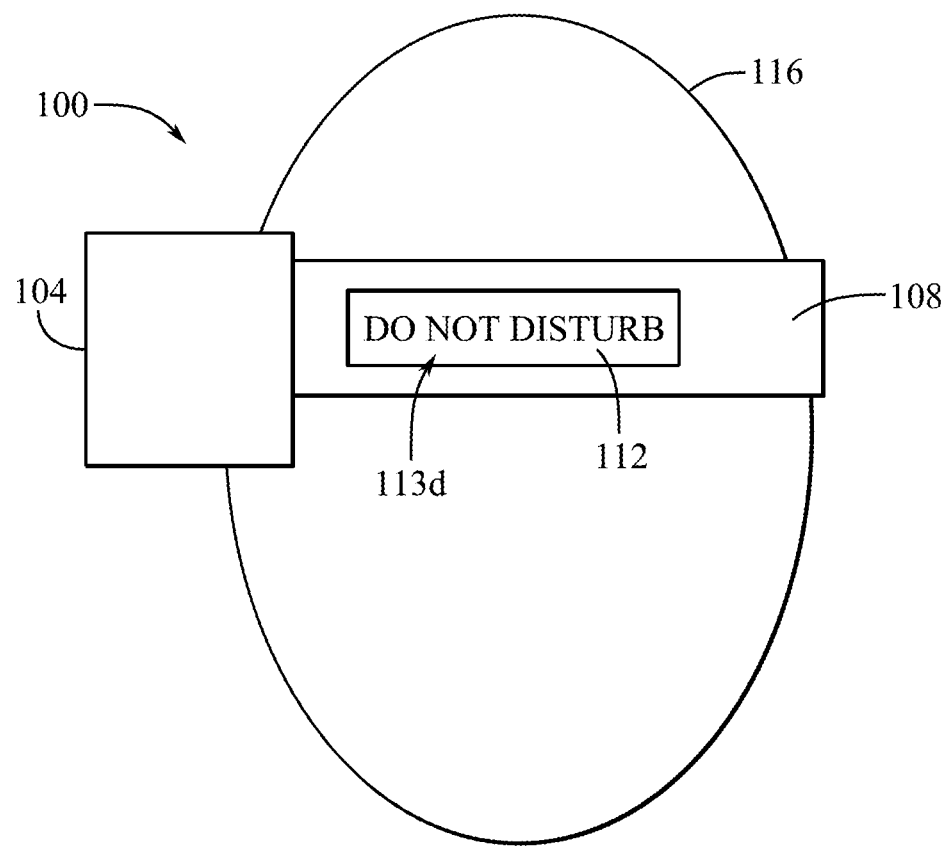
FIG. 6D shows a side view of an example icon displayed on the retention band.

FIG. 6D illustrates the wearable electronic device 100 displaying an alerting icon 113d on the display 112. The alerting icon 113d can notify outside observers of a status of the device 100 or the user. The alerting icon 113d can be chosen by the user and can be intended to convey information to outside observers. As depicted, the alerting icon 113d reads "DO NOT DISTURB." however, it will be understood that other customizable messages can be chosen or generated by the user (e.g., "in a meeting", "on a call", "free at 1:00", etc.). Input and design of the alerting icons 113d can be generated with the wearable electronic device 100, and/or with a separate electronic device, such as a phone, a tablet, or a laptop. In some examples, a proximity or presence of an outside observer triggers the alerting icon 113d to be displayed. The alerting icon 113d can be used to make an observer aware that they are being observed. For example, the wearable device 100 can include external facing cameras or audio recorders and the alerting icon 113d can be activated to inform the observer that the external facing cameras and/or audio recording are on.

Figure 6E:
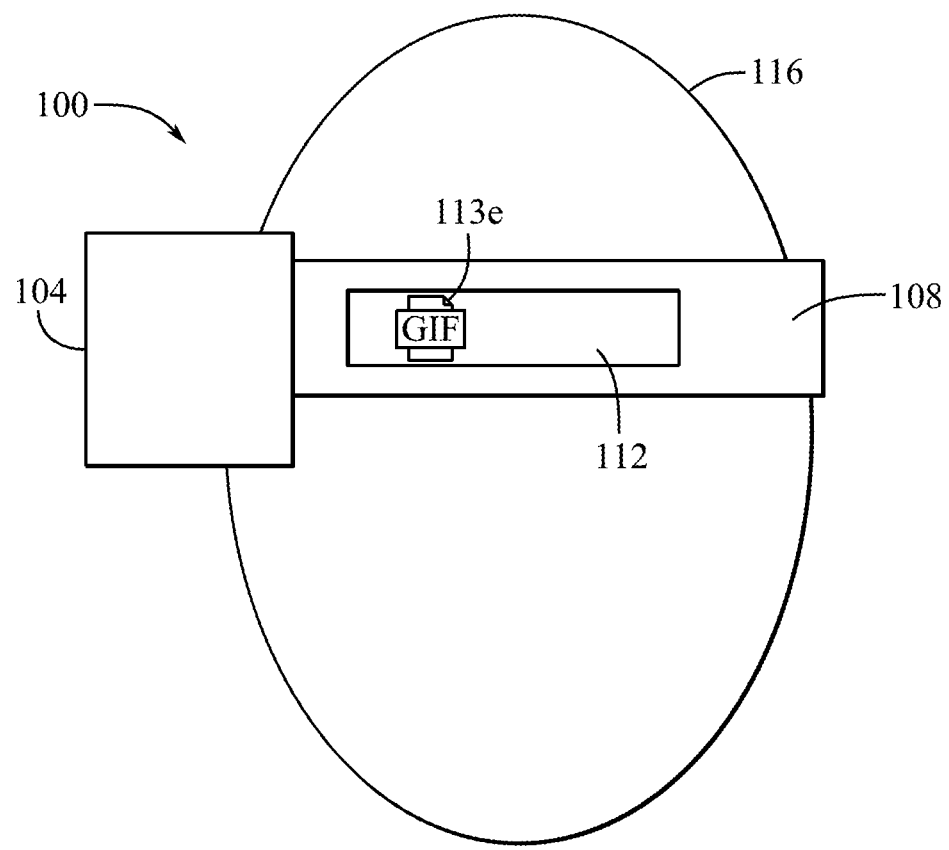
FIG. 6E shows a side view of an example icon displayed on the retention band.

FIG. 6E illustrates the wearable electronic device 100 displaying an animated or movable image 113e, such as a graphics interchange format (GIF) or a video, on the display 112. The movable image 113e can increase the likelihood that the user or outside observer notices the visual information being depicted on the display 112. In some examples, movable image 113e can be an advertisement or animated logo. In some examples, the movable image can mirror what is seen by a user wearing the device 100. In some examples, the movable image can be a live stream of the user's face. An avatar of the user can also be displayed. In some examples, the movable image 113e can be any of the icons 113a-113d described above, but in a non-static format. In some examples, a proximity or presence of an outside observer triggers the movable image 113e to be displayed and/or to animate.

In some examples, light from the display 112 can increase visibility of a user. For example, one or more user's may be located in a dark or dim setting and light from the display 112 can illuminate the user's or their surrounding for improved safety and situational awareness. In some examples, the display 112 can provide signals or displays, such as strobe lights, intended to cause the user to be noticed, or to increase the personal safety of the user.

Figure 7:
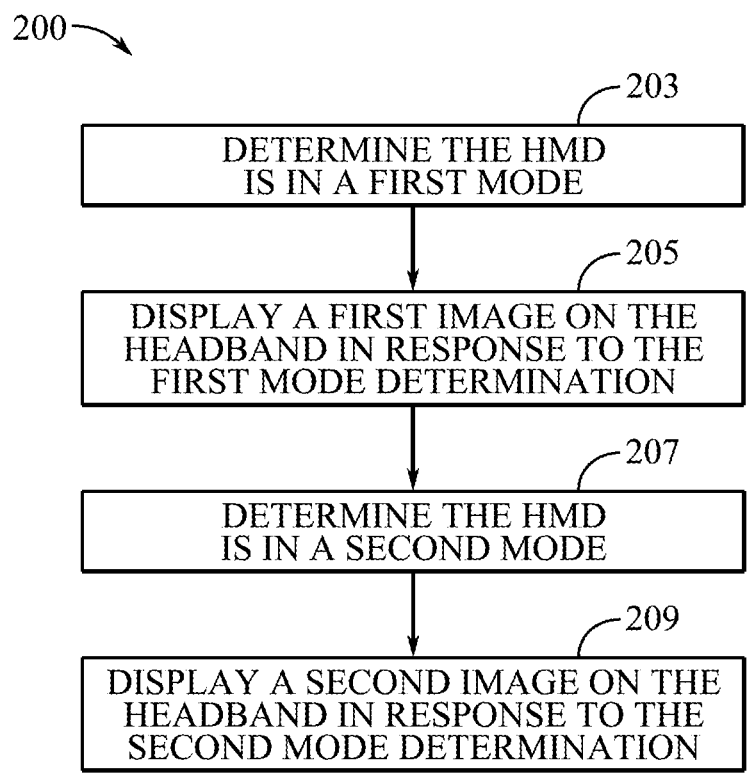
FIG. 7 shows a process flow diagram for displaying images on the retention band.

FIG. 7 illustrates a process flow diagram 200 for modifying the visual information being presented by a headband display based on a mode of the wearable device. At step 203, it is determined that the HMD is in a first mode. This determination can be made by a processor of the HMD. The "mode" refers to any status of the HMD. For example, the first mode can include a sleep mode, an awake mode, a low power mode, a charging mode, on a call mode, and any other status. At step 205, a first image is displayed on the headband as a result of the HMD being in the first mode. At step 207, it is determined, for example, by the processor, that the HMD has changed from the first mode to a second mode. This change can be any change in the operating parameters or status of the HMD. At step 209, a second, different image is displayed on the headband in response to the HMD entering the second mode. For example, a low power mode can cause the display to present a flashing battery icon prompting the user to charge the HMD. Once the HMD enters a charging mode, the flashing low battery icon can change to an icon indicated that charging is underway. The process 200 can assist the user or an observer in confirming a change in the status of the HMD.

While the above examples illustrate the headband display in the context of HMDs, it will be understood that the HMD is not required. For example a user could be wearing the headband alone, such as an athlete wearing a sweatband displaying a team logo. Likewise, the technology described above can be implemented into electronic devices other than an HMD, such as smart glasses. In some examples, the features of the display described above can be implemented on a frame or support arms of smart glasses.

Any of the features or aspects of the devices and components discussed herein can be combined or included in any varied combination. For example, the design and shape of the components or devices is not limited in any way and can be formed by any number of processes, including those discussed herein. As used herein, the terms exterior, outer, interior, and inner are used for reference purposes only. An exterior or outer portion of a component can form a portion of an exterior surface of the component, but may not necessarily form the entire exterior of outer surface thereof. Similarly, the interior or inner portion of a component can form or define an interior or inner portion of the component, but can also form or define a portion of an exterior or outer surface of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "including."

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment includes a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A wearable electronic device comprising: a head-mounted display (HMD); and a retention band connected to the HMD, the retention band comprising: a flexible fabric comprising an outer fabric portion and an inner fabric portion, the flexible fabric configured to: securely retain the wearable electronic device on a user's head; and bend according to a shape of the user's head; a flexible display screen positioned within the retention band between the outer fabric portion and the inner fabric portion and configured to bend according to the shape of the user's head, the outer fabric portion covering the flexible display screen such that light from the flexible display screen is visible to an outside observer when the flexible display screen is illuminated and the flexible display screen is not visible when not illuminated; a cushioning between the outer fabric portion and the inner fabric portion, the cushioning at least partially surrounding the flexible display screen; a touch sensitive layer overlapping the flexible display screen and configured to allow light from the flexible display screen to pass through the touch sensitive layer; and a transparent cover positioned between the outer fabric portion and the flexible display screen, the transparent cover overlaying the flexile display screen and the touch sensitive layer, and the transparent cover configured to deform in response to a force input; wherein the touch sensitive layer is configured to detect the force input based on the deformation of the transparent cover.

2. The wearable electronic device of claim 1, wherein:
the HMD comprises:
a housing; and
a primary display connected to the housing; and
the flexible display screen displays visual information based on a status of the HMD; and
the flexible fabric including perforations.

3. The wearable electronic device of claim 2, wherein the visual information is dynamic.

4. The wearable electronic device of claim 1, wherein the retention band comprises micro-perforations.

5. The wearable electronic device of claim 1, wherein the touch sensitive layer comprises a transparent cover coupled to the retention band and positioned over the flexible display screen.

6. The wearable electronic device of claim 1, wherein:
the HMD comprises:
a housing; and
a primary display connected to the housing; and
the flexible display screen displays visual information that changes based on a mode of the HMD.

7. The wearable electronic device of claim 1, wherein the flexible display screen displays visual information when the wearable electronic device is in an inactive mode.

8. The wearable electronic device of claim 1, further comprising optical fibers woven into the retention band.

9. The wearable electronic device of claim 1, further comprising a battery secured to the retention band.

10. The wearable electronic device of claim 1, further comprising a flexible printed circuit positioned in the retention band.

11. The wearable electronic device of claim 1, wherein the flexible display screen comprises microlight-emitting diodes.

12. The wearable electronic device of claim 1, wherein the flexible display screen comprises an optical fiber.

13. A head-mounted display (HMD), comprising: a housing; a primary display screen disposed in the housing; a retention member coupled to the housing, the retention member band comprising a flexible fabric configured to securely retain the HMD on a user's head; a secondary flexible display integrated with the flexible fabric of the retention member, the secondary flexible display configured to curve according to a shape of the user's head; a touch sensitive layer overlapping at least a portion of the secondary flexible display, the touch sensitive layer being configured to transmit light from the secondary flexible display through the touch sensitive layer; and a cover disposed over the secondary flexible display and the touch sensitive layer, the cover comprising a deformable, light transmissible material; wherein: the retention member comprises cushioning between an inner fabric portion and an outer fabric portion, the cushioning at least partially surrounding the secondary flexible display; and the outer fabric portion disposed over the cover, the outer fabric portion is configured to hide the secondary flexible display when the secondary flexible display is not illuminated and allow light from the secondary flexible display to pass through the outer fabric portion when the secondary flexible display is illuminated.

14. The HMD of claim 13, wherein:
the HMD comprises smart glasses; and
the retention member comprises a support arm.

15. The HMD of claim 13, wherein the retention member comprises a head strap.

16. The HMD of claim 13, wherein visual information displayed by the secondary flexible display changes based on a detected presence of a user.

* * * * *